US006432171B1

(12) United States Patent
Kumar et al.

(10) Patent No.: US 6,432,171 B1
(45) Date of Patent: Aug. 13, 2002

(54) THERMAL SWING ADSORPTION PROCESS

(75) Inventors: Ravi Kumar, Allentown, PA (US); Madhusudhan Huggahalli, Somerset; Martin Bülow, Basking Ridge, both of NJ (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/648,984

(22) Filed: Aug. 28, 2000

(51) Int. Cl.$^7$ ................................................ B01D 53/04
(52) U.S. Cl. ............................ 95/120; 95/123; 95/129; 95/139; 95/143; 95/144; 95/902
(58) Field of Search ........................... 95/117–123, 126, 95/129, 139, 143, 144, 902, 114, 115; 96/108, 130, 132, 143, 144, 154

(56) References Cited

U.S. PATENT DOCUMENTS

| | | |
|---|---|---|
| 2,882,243 A | 4/1959 | Milton |
| 2,882,244 A | 4/1959 | Milton |
| 2,996,358 A | 8/1961 | Milton |
| 3,012,853 A | 12/1961 | Milton |
| 3,503,901 A | 3/1970 | Pickert |
| 3,576,901 A | 4/1971 | Kokotailo et al. |
| 3,723,308 A | 3/1973 | Breck |
| 3,732,326 A | 5/1973 | Chen |
| 3,773,690 A | 11/1973 | Heinze et al. |
| 3,885,927 A | 5/1975 | Sherman et al. |
| 3,985,859 A | 10/1976 | Blaine |
| 4,122,007 A | 10/1978 | Yamamoto et al. |
| 4,173,622 A | 11/1979 | Robertson |
| 4,303,629 A | 12/1981 | Strack et al. |
| 4,443,422 A | 4/1984 | Kostinko |
| 4,556,550 A | 12/1985 | Ross et al. |
| 4,603,040 A | 7/1986 | Kuznicki et al. |
| 4,606,899 A | 8/1986 | Butter et al. |
| 4,775,396 A | 10/1988 | Rastelli et al. |
| 4,913,850 A | 4/1990 | Puppe et al. |
| 5,075,084 A | 12/1991 | Wilhelm et al. |
| 5,152,813 A | 10/1992 | Coe et al. |
| 5,173,462 A | 12/1992 | Plee |
| 5,174,979 A | 12/1992 | Chao et al. |
| 5,203,887 A | * 4/1993 | Toussaint .................. 95/902 X |
| 5,354,360 A | 10/1994 | Coe et al. |
| 5,413,625 A | 5/1995 | Chao et al. |
| 5,451,248 A | * 9/1995 | Sadkowski et al. ....... 95/144 X |
| 5,464,467 A | 11/1995 | Fitch et al. |
| 5,531,808 A | 7/1996 | Ojo et al. |
| 5,560,763 A | * 10/1996 | Kumar ..................... 95/139 X |
| 5,562,756 A | 10/1996 | Coe et al. |
| 5,567,407 A | 10/1996 | Coe et al. |
| 5,656,064 A | 8/1997 | Golden et al. |
| 5,769,928 A | * 6/1998 | Leavitt .................... 95/143 X |
| 5,779,766 A | 7/1998 | Weigel et al. |
| 5,779,767 A | 7/1998 | Golden et al. |
| 5,882,625 A | 3/1999 | Mac Dougall et al. |
| 5,906,675 A | * 5/1999 | Jain et al. ................. 95/143 X |
| 5,908,823 A | 6/1999 | Zatta et al. |
| 5,914,455 A | * 6/1999 | Jain et al. ................. 95/143 X |
| 5,916,836 A | 6/1999 | Toufar et al. |
| 5,962,358 A | 10/1999 | Hees et al. |
| 6,024,781 A | * 2/2000 | Bulow et al. ............. 95/139 X |
| 6,027,548 A | * 2/2000 | Ackley et al. ............ 95/143 X |
| 6,051,051 A | 4/2000 | Hees et al. |
| 6,074,459 A | * 6/2000 | Gingrich et al. ......... 95/143 X |
| 6,099,619 A | * 8/2000 | Lansbarkis et al. ....... 95/143 X |
| 6,106,593 A | 8/2000 | Golden et al. |
| 6,113,671 A | * 9/2000 | Garrett .................... 95/144 X |
| 6,143,057 A | 11/2000 | Bülow et al. |
| 6,238,460 B1 | * 5/2001 | Deng et al. ............... 95/139 X |
| 6,270,557 B1 | * 8/2001 | Millet et al. ............. 95/139 X |
| 6,273,939 B1 | * 8/2001 | Millet et al. ............. 95/139 X |
| 6,309,445 B1 | * 10/2001 | Gittleman et al. ........ 95/139 X |

FOREIGN PATENT DOCUMENTS

| | | |
|---|---|---|
| DE | 43 221 | 11/1965 |
| DE | 2 016 838 | 4/1970 |
| EP | 0 196 103 A2 | 3/1986 |
| EP | 0 995 477 A1 | 4/2000 |
| GB | 1 051 621 | 12/1966 |
| GB | 1 580 928 | 12/1980 |
| WO | WO 99/05063 | 2/1999 |

OTHER PUBLICATIONS

M. Tatic and B. Drzaj, Studies in Surface Science and Catalysis, vol. 24 (Zeolites: Synthesis, Structure, Technology and Application), "A Contribution to the Synthesis of the Low–Silica X Zeolite" pp. 129–136, 1985.

Günter H. Kühl, "Crystallization of Low–Silica Faujasite ($SiO_2/Al_2O_3$~2.0)", Zeolites, 1987, vol. 7, Sep., pp. 451–457.

C. G. Coe, "Molecularly Engineered Adsorbents for Air Separation," Process Technology Proceedings, vol. 8, 1990, pp. 149–157.

D. W. Breck, W.G. Eversole, R. M. Milton, T. B. Reed and T. L. Thomas, "Crystalline Zeolites. I. The Properties of a New Synthetic Zeolite, Type A," Journal of the American Society, vol. 78, Dec. 8, 1956, No. 23, pp. 5963–5977.

* cited by examiner

Primary Examiner—Robert H. Spitzer
(74) Attorney, Agent, or Firm—Philip H. Von Neida; Salvatore P. Pace

(57) ABSTRACT

The present invention provides for a thermal swing adsorption process for the removal of trace impurities such as oxides of nitrogen and hydrocarbons from air prior to its separation by cryogenic distillation. The process may utilize three adsorbent layers, the first primarily removes water; the second primarily removes carbon dioxide; and the third layer is a composite adsorbent layer which removes the oxides of nitrogen and hydrocarbons from the air stream. Another embodiment employs a two layer adsorbent system to remove the impurities. Additionally, a single layer of composite adsorbent may be used to remove water, carbon dioxide, oxides of nitrogen, and hydrocarbons from the air stream.

38 Claims, No Drawings

THERMAL SWING ADSORPTION PROCESS

FIELD OF THE INVENTION

The present invention relates to a novel thermal swing adsorption (TSA) process for the removal of hydrocarbons and oxides of nitrogen from air. More particularly, the present invention relates to a TSA process for use in pre-purification units (PPU) prior to cryogenic distillation of air to separate it into oxygen and nitrogen.

BACKGROUND OF THE INVENTION

Prior to cryogenic air separation by distillation to produce oxygen and nitrogen, various trace impurities must be removed from feed air to avoid formation of solids in the heat exchanger equipment and resultant high pressure and safety issues in the cryogenic process. The most obvious trace air impurities that must be removed include carbon dioxide, $CO_2$, and water, $H_2O$. There are many references which disclose the use of pressure swing adsorption, PSA, and thermal swing adsorption, TSA, to remove these types of impurities from air in pre-purification units prior to cryogenic separation of air by its distillation into oxygen nitrogen and argon.

The importance of the removal of nitrogen oxides from air prior to entering into a cryogenic air separation plant has only recently been recognized. The removal of dinitrogen oxide, $N_2O$, which is also known as nitrous oxide, is particularly important because of its increase in concentration in the atmosphere. It is well known that $N_2O$ is a greenhouse gas and the concentration of $N_2O$ in the atmosphere (currently about 0.3 ppm) has been increasing steadily (by about 0.2 to 0.3% annually), over the last decade. This increase is mainly caused by anthropogenic activities as well as by emissions from various chemical processes. An excess of $N_2O$ in cryogenic air separation units may lead to tube p contamination of the products. The fact that $N_2O$ is very stable in air, viz., its "lifetime" in the atmosphere comprises about 150 years, makes the removal of $N_2O$ in an air pre-purification unit absolutely essential in both present time and the future. It is envisioned that in the future the removal of $N_2O$ will become as important as the removal of water and $CO_2$. As the concentration of $N_2O$ in air increases further, the current regime of PPU processes will become inadequate because $N_2O$ cannot be removed easily by existing PPU processes. Accordingly, there is a clear need to develop an approved adsorption process suitable for use in PPU units to remove not only water and $CO_2$ but also the trace amounts of nitrogen oxides, in particular $N_2O$, which are present in the air being sent to th addition, great care should be taken for the removal of traces of hydrocarbons, such as low-molecular weight hydrocarbon gases ethane, propane, n-butane, iso-butane as well as any non-saturated species, such as acetylene, ethylene, propylene, the n-butylene isomers and iso-butylene, from air in PPU processes. It is also important that both hydrocarbons and plugging components such as $N_2O$ and $CO_2$ be simultaneously removed in the air pre-purification process. Deposits of plugging components may create an opportunity for hydrocarbons to collect and concentrate in those deposits. The present invention is directed to such a solution, which aims, in particular, to a simultaneous, highly effective pre-purification of air.

$N_2O$ is not the only hazardous trace impurity present in atmospheric air. $N_2O$ belongs to a class of hazardous impurities collectively referred to as plugging/plating components. Water and $CO_2$ are the other plugging/plating components removed in the PPU. These impurities freeze at cryogenic temperatures and plug passages and plate out on cold surfaces. Atmospheric air also contains several hydrocarbon impurities that must not be allowed to come in contact with liquid oxygen. Typically, hydrocarbon impurities enter the cold box, and accumulate in the liquid oxygen sump in the reboiler of the low-pressure column. The air separation process also concentrates the levels of these impurities, such that their concentrations in the low-pressure column are several times greater than their concentrations in the PPU product.

When the solubility and flammability limits of these compounds in liquid oxygen are exceeded, these compounds may be combusted, leading to small explosions and in extreme cases, to the combustion of the distillation column internals. The accumulation of hydrocarbon impurities can also take place inside the passages of heat exchangers and reboilers causing the same problems as seen in the distillation column. This accumulation in passages of heat exchangers is aggravated by the presence of plugging/plating components. Plated $N_2O$ and $CO_2$ may create pockets of stagnant liquid oxygen in which hydrocarbons can accumulate and concentrate beyond flammability limits.

It is clear that plugging components and hydrocarbons pose a combined threat to ASU safety, in addition to their individual deleterious effects. These observations highlight the need to remove in the PPU process not only $N_2O$ but hydrocarbons as well. The present invention is directed to such a solution that aims, in particular, to a simultaneous, highly effective pre-purification of air in a thermal swing adsorption process.

SUMMARY OF THE INVENTION

The present invention provides for a novel process for the removal of impurities from a gas stream by thermal swing adsorption. The process comprises passing a gas stream containing impurities through a first adsorbent that is capable of removing water from the gas stream, then passing the stream through a second adsorbent layer which is capable of removing carbon dioxide from the gas. Lastly, the gas stream is passed through a third layer capable of removing hydrocarbons and oxides of nitrogen from the gas.

The third adsorbent is a composite adsorbent that contains at least one adsorbent that will adsorb preferentially oxides of nitrogen and a series of hydrocarbons, ie., "$N_2O$ removal adsorbent", and at least one adsorbent that will adsorb preferentially those hydrocarbons that were adsorbed by the first adsorbent to lesser an extent, i.e., "hydrocarbon removal adsorbent". Preferably, the "$N_2O$ removal adsorbent" is a CaLSX, CaMSX or CaX type zeolite and the "hydrocarbon removal adsorbent" is a CaA type zeolite.

A composite adsorbent as to this invention is understood as a physical mixture of primary particles (micro-particles) of at least two types of adsorbents, e.g., zeolites mentioned, that stem from separate syntheses, and shaped by extruding or beading or another known method into macro-particles of the final type, using a binder material.

In a preferred embodiment of the present invention, there is provided a process comprising passing a gas stream containing impurities through a first adsorbent which is capable of substantially removing carbon dioxide and moisture from the gas stream and then passing the gas stream through a second adsorbent layer which is capable of removing hydrocarbons and oxides of nitrogen from the gas. In this embodiment, the first layer is a zeolite and the second layer is the composite adsorbent.

In a different embodiment of the present invention, there is provided a process comprising passing a gas stream containing impurities through a first adsorbent which is capable of substantially removing moisture from the gas stream and then passing the gas stream through a second adsorbent layer which is capable of removing carbon dioxide, hydrocarbons and oxides of nitrogen from the gas. In this embodiment, the first layer is activated alumina and the second layer is the composite adsorbent.

In another preferred embodiment, there is provided a process comprising passing a gas stream containing impurities through the composite adsorbent which will substantially remove water, carbon dioxide and hydrocarbons and oxides of nitrogen from the gas. In this embodiment, the composite adsorbent comprises a first adsorbent and a second adsorbent.

The advantage of the present invention resides in its relative simplicity compared to using a fourth adsorbent layer. The use of the composite adsorbent will convert the temperature swing adsorption pre-purification unit into a unit which will not only remove water and carbon dioxide from gas streams prior to entry into the cryogenic air separation unit but will also remove the undesirable nitrogen oxides, especially dinitrogen oxide, and saturated and non-saturated hydrocarbons from the gas stream. This leads to a gas stream entering the cryogenic distillation unit that is substantially free of trace impurities. The resultant highly purified air stream entering the cryogenic air separation unit results in a much safer plant operation and enables the air separation unit to give products that have an even higher purity than previously attained.

DETAILED DESCRIPTION OF THE INVENTION

The present invention comprises a process for the removal of impurities from a gas stream by thermal swing adsorption comprising sequentially passing the gas stream through a first adsorbent layer that will remove water from the gas stream, a second adsorbent layer that will remove carbon dioxide from the gas stream, and a third adsorbent layer that will remove both oxides of nitrogen and hydrocarbons from the gas stream.

For purposes of the present invention, the word "substantially" when used with regards to "remove" or "removing" impurity or impurities is defined as at least 80% of the impurity or impurities removed.

Typically, the feed to a cryogenic air separation unit (ASU) comprises atmospheric air containing water vapor, carbon dioxide and trace impurities including dinitrogen oxide, acetylene, ethane, propane and other hydrocarbons. The feed is normally passed through a TSA pre-purification unit to remove the water and carbon dioxide. Current TSA-PPU designs are suitable for this removal but not fully adequate for the removal of trace impurities such as the various oxides of nitrogen and/or hydrocarbons. The process of the present invention is directed to a novel adsorbent and adsorbent arrangement in a TSA-PPU which will remove the water and carbon dioxide but also oxides of nitrogen and hydrocarbons, from the air feed prior to entry of the air feed into the ASU for the separation of nitrogen, $N_2$, and oxygen, $O_2$. The adsorbent and adsorbent arrangements of this invention can be used in pressure swing adsorption (PSA) - PPU plants as well.

The first adsorbent layer is activated alumina (AA) or zeolite NaX, but any typical water adsorbent material may be used.

The second adsorbent layer is a zeolite X material, particularly a NaLSX-type zeolite, which is understood as a zeolite X material with a silicon-to-aluminum atomic ratio in the range between 0.9 and 1.1. The crystal structure of this material is that of the mineral faujasite and is denoted as FAU, by the Structure Commission of the International Zeolite Association.

The third adsorbent layer is a composite adsorbent which comprises a "hydrocarbon removal adsorbent" that, herein, will further be called "hydrocarbon adsorbent", and an "oxides of nitrogen removal adsorbent" that, herein, will further be called "$N_2O$ adsorbent". The hydrocarbon adsorbent is selected from the group consisting of types A and X zeolites, silica gel and other non-zeolite adsorbents. The $N_2O$ adsorbent is selected from the group consisting of zeolite types A, X or Y. Preferably the hydrocarbon adsorbent is a CaA type zeolite and the $N_2O$ adsorbent is CaLSX, CaMSX or CaX type zeolite. For purposes of the present invention, the composite adsorbent may contain one or more hydrocarbon adsorbents and one or more $N_2O$ adsorbents depending upon the nature of impurities in the gas stream.

The composite adsorbent as to this invention is understood as a physical mixture of primary particles (microparticles) of at least two types of adsorbents, e.g., zeolites mentioned, that stem from separate syntheses, and shaped by extruding or beading or another known method into macroparticles of the final type, using a binder material.

Particular adsorbent formulations to form composites of this invention are described as follows.

The CaLSX, CaMSX and CaX, zeolites are X-type zeolites (FAU zeolites) with respective values of silicon-to-aluminum atomic ratio of the zeolitic phase, i.e., binderless crystalline phase, that range approximately from 0.9 to 1.1, 1.1 to 1.15 and 1.16 to 3.0 respectively, and whose exchangeable cations on an equivalent basis include about 0 to about 100% calcium ions, and about 100 to about 0% other ions, the other ions being selected from the group consisting of Group IA ions such as lithium, sodium and potassium, from Group IIA ions other than calcium, from Group IB ions other than gold, from Group IIB ions other than mercury, and from ions of the lanthanides, and mixtures of these, preferably, however, from 0.9 to 1.15, and a cation composition of this adsorbent comprises from about 50 to about 100% of calcium ions and about 50 to about 0% of cations being selected from the Group IA such as lithium, sodium and potassium, from Group IIA ions other than calcium, from Group IB ions other than gold, from Group IIB ions other than mercury, and from ions of the lanthanides, and mixtures of these, and especially preferred between 0.95 and 1.05, and a cation composition that comprises from about 90 to about 100% of calcium ions and about 10 to about 0% of cations being selected from the group consisting of Group IA ions such as lithium, sodium and potassium, from Group IIA ions other than calcium, from Group IB ions other than gold, from Group IIB ions other than mercury, and from ions of the lanthanides, and mixtures of these. The FAU materials with a silicon-to-aluminum atomic ratio from 0.9 to 1.15, and the described cation compositions will here and further on be named as calcium Low-Silicon X-type zeolite (CaLSX type zeolite).

It is anticipated that the role of the calcium cation in the composition of the X-type zeolites as "$N_2O$ adsorbent" of this invention can be replaced by other two-valent metal ions such as magnesium strontium, zinc and cadmium in addition to the Group IIA and IIB metals detailed in the proceeding paragraph.

The composite adsorbent will contain from about 2 to about 98 wt. % N$_2$O adsorbent and about 98 to about 2 wt. % hydrocarbon adsorbent. Preferably this range will be about 50 wt. % N$_2$O adsorbent and 50 wt. % hydrocarbon adsorbent.

Preferably the gas stream is air and the hydrocarbon impurities are selected from the group consisting of methane, acetylene, ethylene, propylene, ethane, propane, n-butane, iso-butane, n-butylene isomers and iso-butylene. The oxides of nitrogen impurities are nitrous oxide, nitric oxide, nitrogen dioxide, dinitrogen tetroxide and dinitrogen pentoxide.

In a preferred embodiment, the TSA process of the present invention is performed upstream of a cryogenic air separation unit in an air PPU.

The composite adsorbent preferably comprises a bound material with the crystalline zeolitic part comprised of a CaA type zeolite and either a CaLSX, CAMSX or CaX type zeolite. With regard to the zeolitic part, the ratio of each adsorbent in the composite ranges from about 2% to about 98% of hydrocarbon adsorbent to about 98% to about 2% N$_2$O adsorbent.

The composite adsorbents of the present invention are used in form of shaped particles also known as secondary particles (macro-particles). These secondary particles may be shaped by a series of methods into various geometrical forms such as beads, extrudates, and hollow extrudates. Inorganic binder materials are added to the zeolitic crystalline phase prior to the shaping process. These binders allow for necessary mechanical strength of the particles and creation of a transport macropore system in the interior of the latter particles needed for effective mass transfer performance properties with regard to sorbing species. Binder content may vary depending upon the type of binder material used and shaping procedure, but it is typically about 5 to about 25 wt. % of the final product.

The following examples are merely representative of the present invention and should not be construed as limiting thereof.

EXAMPLES

Testing using the process of the present invention were performed on TSA PPUs. In addition to CO$_2$ and H$_2$O, the following trace impurities were injected into the air fed to the PPUs: N$_2$O, CH$_4$, C$_2$H$_4$, C$_2$H$_6$, C$_3$H$_6$, C$_3$H$_8$, C$_2$H$_2$ and n-C$_4$H$_{10}$. In all cases the CO$_2$ concentration in the TSA PPU product is ~1 ppm. The commercial adsorbent product, NaX zeolite of the UOP grade APG II, fully removed C$_2$H$_2$, CO$_2$, C$_3$H$_6$, n-C$_4$H$_{10}$ and H$_2$O but does not fully remove N$_2$O, CH$_4$, C$_2$H$_4$, C$_2$A similar result was obtained for the BOC NaLSX PPU adsorbent.

The results of this testing for TSA PPUs are reported in Table I.

TABLE I

TSA-PPU Performance
Feed Pressure = 86–110 psia
Feed Temperature = 12–25° C.
Total Bed Height = 59 inches

| Feed Impurity (conc. ppm) | Detection Limit (ppm) | UOP APG II % Removal | BOC NaLSX % Removal | Present Invention Composite Adsorbent* % Removal |
|---|---|---|---|---|
| Water (saturated) | 1 | 100 | 100 | 100 |
| CO$_2$ (400) | 0.001 | 100 | 100 | 100 |
| N$_2$O (0.3–0.35) | 0.005 | 35 | 45 | 100 |
| CH$_4$ (2.2) | 0.01 | 0 | 0 | 0 |
| C$_2$H$_2$ (0.4–0.48) | 0.007 | 100 | 100 | 100 |
| C$_2$H$_4$ (1.4–1.6) | 0.01 | 35 | 40 | 100 |
| C$_2$H$_6$ (1.4) | 0.01 | 10 | 10 | 84 |
| C$_3$H$_6$ (0.55–0.75) | 0.01 | 100 | 100 | 100 |
| C$_3$H$_8$ (1.5–1.6) | 0.05 | 40 | 35 | 98 |
| n-C$_4$H$_{10}$ (1.6–1.8) | 0.02 | 100 | 100 | 100 |

*50% CaLSX and 50% CaA.

As can be seen from Table I, the 50/50 CaLSX/CaA composite can remove all the trace impurities including N$_2$O and hydrocarbons almost completely.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for the removal of impurities from a gas stream by thermal swing adsorption comprising sequentially passing said gas stream through a first adsorbent layer which will substantially remove water from said gas stream, a second adsorbent layer comprising a NaX, NaMSX or NaLSX zeolite which will substantially remove CO$_2$ from said gas stream, and a third adsorbent layer comprising a composite adsorbent which comprises a hydrocarbon removal adsorbent and an adsorbent to remove oxides of nitrogen.

2. The process as claimed in claim 1 wherein said hydrocarbon removal adsorbent is selected from the group consisting of types A and X zeolites and silica gel.

3. The process as claimed in claim 2 wherein said hydrocarbon removal adsorbent is a CaA type zeolite.

4. The process as claimed in claim 1 wherein said adsorbent for removal of oxides of nitrogen is selected from the group consisting of A, X and Y zeolites.

5. The process as claimed in claim 4 wherein said adsorbent for removal of oxides of nitrogen is CaLSX, CaMSX or CaX type zeolite.

6. The process as claimed in claim 5 wherein said CaLSX zeolite has a silicon-to-aluminum atomic ratio of the zeolitic phase between 0.95 and 1.05 and a cation composition that comprises from about 90% to about 100% of calcium ions and about 10 to about 0% of cations being selected from the group consisting of Group IA ions, from Group IIA ions other than calcium, from Group 1B ions other than gold, from Group HB ions other than mercury, and from ions of the lanthanides, and mixtures of these.

7. The process as claimed in claim 6, wherein said Group IA ions are selected from the group consisting of lithium, sodium and potassium.

8. The process claimed in claim 1 wherein said first adsorbent layer is activated alumina.

9. The process as claimed in claim 1 wherein said composite adsorbent comprises one or more of said hydrocarbon removal adsorbents and one or more of said adsorbents for removal of oxides of nitrogen.

10. The process as claimed in claim 1 wherein said composite adsorbent comprises a CaA type zeolite and a CaLSX type zeolite.

11. The process as claimed in claim 1 wherein said composite adsorbent comprises a CaA type zeolite and a CaX type zeolite.

12. The process as claimed in claim 1 wherein said composite adsorbent comprises a CaA type zeolite and a CaMSX type zeolite.

13. The process as claimed in claim 1 wherein said gas stream comprises air.

14. The process as claimed in claim 1 wherein said oxides of nitrogen comprises $N_2O$.

15. The process as claimed in claim 1 wherein said hydrocarbons are selected from the group consisting of methane, acetylene, ethylene, ethane, propylene, propane, n-butane, iso-butane, n-butylene isomers and iso-butylene.

16. The process as claimed in claim 1 wherein said thermal swing adsorption is part of an air pre-purification unit.

17. The process as claimed in claim 16 wherein the gas stream exiting said pre-purification unit is fed directly into a cryogenic air separation unit.

18. The process as claimed in claim 1 wherein said composite adsorbent is in the form of a shaped particle.

19. The process as claimed in claim 18 wherein said composite adsorbent further comprises a binder.

20. A process for the removal of impurities from a gas stream by thermal swing adsorption comprising sequentially passing said gas stream through a first adsorbent layer which will substantially remove water from said gas stream and a second adsorbent layer which comprises a hydrocarbon removal adsorbent and an adsorbent to remove oxides of nitrogen.

21. The process as claimed in claim 20 wherein said hydrocarbon removal adsorbent is selected from the group consisting of types A and X zeolites and silica gel.

22. The process as claimed in claim 21 wherein said hydrocarbon removal adsorbent is a CaA type zeolite.

23. The process as claimed in claim 20 wherein said oxides of nitrogen removal adsorbent is selected from the group consisting of A, X and Y zeolites.

24. The process as claimed in claim 23 wherein a said oxide of nitrogen removal adsorbent is CaLSX, CaMSX or CaX type zeolite.

25. The process as claimed in claim 20 wherein said first adsorbent layer is activated alumina.

26. The process as claimed in claim 20 wherein said second adsorbent layer comprises one or more of said hydrocarbon removal adsorbents and one or more of said oxides of nitrogen removal adsorbents.

27. The process as claimed in claim 20 wherein said second adsorbent layer comprises a CaA type zeolite and a CaLSX type zeolite.

28. The process as claimed in claim 27 wherein said CaLSX zeolite has a silicon-to-aluminum atomic ratio of the zeolitic phase between 0.95 and 1.05 and a cation composition that comprises from about 90% to about 100% of calcium ions and about 10 to about 0% of cations being selected from the group consisting of Group IA ions, from Group IIA ions other than calcium, from Group B ions other than gold, from Group HB ions other than mercury, and from ions of the lanthanides, and mixtures of these.

29. The process as claimed in claim 28 wherein said Group IA ions are selected from the group consisting of lithium, sodium and potassium.

30. The process as claimed in claim 20 wherein said second adsorbent layer comprises a CaA type zeolite and a CaMSX type zeolite.

31. The process as claimed in claim 20 wherein said gas stream comprises air.

32. The process as claimed in claim 20 wherein said oxides of nitrogen comprises $N_2O$.

33. The process as claimed in claim 20 wherein said thermal swing adsorption is part of an air pre-purification unit.

34. The process as claimed in claim 33 wherein the gas stream exiting said pre-purification unit is fed directly into a cryogenic air separation unit.

35. The process as claimed in claim 20 wherein said hydrocarbon removal adsorbent and said adsorbent to remove nitrogen oxides are in the form of a shaped particle.

36. The process as claimed in claim 35 wherein said shaped particle further comprises a binder.

37. The process as claimed in claim 20 further comprising removing carbon dioxide with said second adsorbent layer.

38. The process as claimed in claim 20 further comprising removing carbon dioxide with said first adsorbent layer.

* * * * *